United States Patent [19]
Shinjo et al.

[11] Patent Number: 5,895,000
[45] Date of Patent: *Apr. 13, 1999

[54] GLASS CRUSHING MACHINE AND GLASS CRUSHING SYSTEM USING THE SAME

[75] Inventors: Hiroshi Shinjo, Okinawa-ken; Toyoyuki Okamoto, Yamaguchi-ken, both of Japan

[73] Assignees: Trim Co., Ltd., Okinawa-ken; Toyo System Plants Co., Ltd., Yamaguchi-ken, both of Japan

[21] Appl. No.: 08/900,664

[22] Filed: Jul. 25, 1997

[30] Foreign Application Priority Data

Nov. 13, 1996  [JP]  Japan ................... 8-318839

[51] Int. Cl.$^6$ ................... B02C 15/00; B02C 19/14
[52] U.S. Cl. ............ 241/84.2; 241/89.1; 241/89.2; 241/99; 241/100; 241/107
[58] Field of Search ............ 241/99–100, 107–108, 241/69, 79.1, 71, 84.2, 89.1, 89.2, 128, 133

[56] References Cited

U.S. PATENT DOCUMENTS

| | | | |
|---|---|---|---|
| 2,031,149 | 2/1936 | Elrich et al. | 241/69 |
| 2,440,927 | 5/1948 | Boss et al. | 241/89.2 |
| 2,840,318 | 6/1958 | Schnell | 241/89.4 |
| 2,964,187 | 12/1960 | Riedel | 241/68 |
| 3,322,355 | 5/1967 | Bryant | 241/99 |
| 3,429,435 | 2/1969 | Eckhardt | 241/79.1 |
| 3,687,062 | 8/1972 | Frank | 241/99 |
| 3,761,025 | 9/1973 | Young | 241/107 |
| 4,205,794 | 6/1980 | Horton et al. | 241/99 |
| 4,795,103 | 1/1989 | Lech | 241/99 |
| 4,867,384 | 9/1989 | Waltert | 241/99 |
| 5,215,265 | 6/1993 | Lodovico | 241/99 |
| 5,310,122 | 5/1994 | McFarlane | 241/99 |
| 5,335,867 | 8/1994 | Stehr et al. | 241/69 |
| 5,472,147 | 12/1995 | Doppstadt | 241/89.1 |
| 5,520,343 | 5/1996 | Aika et al. | 241/99 |
| 5,586,730 | 12/1996 | Mortrud | 241/79.1 |
| 5,743,473 | 4/1998 | Gregg | 241/99 |

FOREIGN PATENT DOCUMENTS

| | | | |
|---|---|---|---|
| 3211-137 A1 | 10/1983 | Germany | 241/107 |
| 51658 | 8/1966 | Poland | 241/69 |

Primary Examiner—Joseph J. Hail, III
Assistant Examiner—Susan R. Kingsbury
Attorney, Agent, or Firm—Sughrue, Mion, Zinn, Macpeak & Seas, PLLC

[57] ABSTRACT

A glass crushing machine and glass crushing system comprise a cylinder crushing chamber 2; a powder and particle collecting chamber 4 formed to be cylindrical and disposed downward of the crushing chamber 2; a funnel-like crushed substance collecting portion 5 disposed at the powder and particle collecting chamber 4; a porous bottom plate 7, detachably and attachably disposed between the crushing chamber 2 and the powder and particle collecting chamber 5, having a number of pores and divided into a plurality of segments; a drive shaft 8 disposed at a roughly middle part of the crushing chamber 2; a roller rotating shaft 10 connected to the drive shaft 8 via a connection member; crushing rollers 11 rotatably fitted to the roller rotating shaft 10 and having crushing elements 12 consisting of rows of square columns formed in duplex on the outer circumferential surface. The glass crushing machine has excellent durability, and can efficiently crush a large quantity of glass products into any desired particle size without leaving crushed pieces of glass in the crushing chamber and without damaging the drive portion. Furthermore, the glass crusher can be adapted to be mobile.

10 Claims, 7 Drawing Sheets

100

GLASS CRUSHING MACHINE AND GLASS CRUSHING SYSTEM USING THE SAME

BACKGROUND OF THE INVENTION

The present invention relates to an apparatus for treating glass products such as glass bottles by breaking and crushing the same into particles, powder, etc.

Recently, a glass crushing machine has been proposed as equipment for crushing glass products such as glass bottles into powder, particles, etc, which comprises a crushing chamber, a bottom plate fixed at the bottom surface of a crushing chamber and having a number of pores of a fixed size, a movable plate having a number of pores downward of the bottom plate and disposed to be movable, a crushed substance collecting portion disposed downward of the movable plate, a discharge port disposed at the crushed substance collecting portion, a drive shaft disposed so as to penetrate the bottom plate at a roughly middle of the crushing chamber, a drive portion disposed downward of the crushing chamber via the movable plate and connected to the drive shaft, a roller rotating shaft connected to the drive shaft, a crushing roller fitted into the roller rotating shaft and having a plurality of square columnar projections on the outer circumferential surface thereof, and two scraping plates connected to the drive shaft and disposed so as to move along the inner and outer circumferential sides of the crushing roller when the drive shaft rotates.

Hereinafter a description will be given of actions of a conventional glass crushing machine.

The size of pores can be adjusted by changing the overlapping length of the bottom plate and the movable plate by moving the movable plate disposed downward of the bottom plate.

Next, the drive shaft is rotated at the drive portion, and the roller rotating shaft connected to the drive shaft and scraping plates are accordingly rotated centering around the drive shaft, thereby causing the crushing roller to rotate. At the same time, the crushing roller is rotated centering around the rotating shaft, whereby glass products such as glass bottles charged in a crushing chamber are crushed by a crushing roller. As glass products are crushed to such a particle size as can pass through the pores of the bottom plate of the crushing chamber, the crushed glass particles drops into the crushed substance collecting portion through the pores, the diameter of which is adjusted by the overlap between the bottom plate and movable plate, thereby causing the crushed substances to be collected. Furthermore, the scraping plates turns centering around the drive shaft while they are raking up glass crushed particles toward the passage side along which the crushing roller passes.

However, the abovementioned conventional crushing machine inherently has the following shortcomings.

Since the drive portion is disposed downward of the crushing chamber via the movable plate, dust and dirt may be likely to fall onto the drive portion, whereby a trouble of the drive portion such as seizing due to the dust and dirt is apt to occur, and it is difficult to perform maintenance of the drive portion.

Furthermore, since the angle of rest of glass is large to be 45° to cause the inclination angle of the bottom plate of the crushed substance collecting portion to be large, the glass crushing machine is unavoidably made large-sized in its vertical direction, requiring a wide area of installation. Therefore, it has been highly demanded that the glass crushing machine is made more compact.

Furthermore, since only one crushing roller is provided, the crushing efficiency of glass products is low and the treatment capacity is insufficient. Moreover, since the interval of the respective square columnar projections formed on the outer circumferential surface of a crushing roller is wide, there remains an area where the bottom plate are not brought into contact with the projections. This induces a shortcoming in the crushing efficiency of glass products.

Furthermore, since the scraping plates turns while they are raking up crushed pieces toward the passage side of the crushing roller, a resistance force operates on the scraping plates while turning, whereby there are such problems where the scraping plates are apt to be deformed and the efficiency of raking up the crushed pieces toward the passage side of the crushing roller is insufficient.

Still furthermore, since the overlap of the movable plate and the pores of the bottom plate are adjusted to change the particle size of crushed pieces, crushed powder and particles may be accumulated between the movable plate and bottom plate. There causes such a problem where powder and particles are apt to remain in the crushing chamber.

SUMMARY OF THE INVENTION

The present invention is to solve these and other problems of the abovementioned conventional crushing machines, and it is therefore an object of the invention to provide a glass crushing machine, which is superior in the crushing efficiency of glass products such as glass bottles, capable of crushing them to any optional particle size without any powder and particles remaining in its crushing chamber, and preventing its drive portion from being influenced by dust and dirt, wherein the durability and maintenance property thereof are excellent, and to provide a glass crushing system, which is able to crush glass very efficiently and to classify and collect crushed glass in accordance with particle sizes, has a good workability and is very compact, whereby the glass crushing system can be installed on the deck of a truck, etc. so as to secure a good movability, and further is excellent in manpower saving since a single person is able to control the entire plant, using a control board.

In order to solve the abovementioned themes, a glass crushing machine according to the invention comprises; a cylindrical crushing chamber; a powder and particle accumulation preventing plate, which is inclined and disposed at the inner wall at the downward outer circumferential side of the crushing chamber; a drive shaft disposed at a roughly middle portion of the crushing chamber and aligned with the axial direction of the crushing chamber; a drive portion connected to the drive shaft and disposed on the upper surface of the ceiling portion of the crushing chamber; a cylindrical powder and particle collecting chamber disposed downward of the crushing chamber; a supporting beam portion disposed upward of the powder and particle collecting chamber; a crushed substance collecting portion formed to be funnel-like and disposed downward of the supporting beam portion of the powder and particle collecting chamber; a height adjusting portion disposed in the crushing chamber and/or the powder and particle collecting chamber; a bottom plate insertion portion formed at the height adjusting portion between the crushing chamber and the powder and particle collecting chamber; a porous bottom plate which is detachably attached to the bottom plate insertion portion, is provided with a number of pores, and is divided into a plurality; two or more roller rotating shafts connected to the drive shaft via a connection means; two or more crushing rollers rotatably fitted to the roller rotating shafts; and crushing elements, consisting of rows of square columns, formed on the outer circumferential surface of the crushing rollers at a phase differential of 15° to 45°, preferably 20° to 40°, in a duplex state.

With the abovementioned construction, the interval between the crushing chamber and the powder and particle collecting chamber can be adjusted at the height adjusting portion, and by replacing the porous bottom plate detachably and attachably disposed at the bottom plate insertion portion with a porous bottom plate, the pore size of which is different, the glass products can be crushed to any optional particle size and simultaneously since the porous bottom plate is divided into a plurality, it is possible to arrange porous bottom plates having different pore diameters part by part at the bottom plate insertion portion, whereby the glass crushing machine has an action by which crushed substances having different particle sizes can be obtained at a time.

Furthermore, since a powder and particle accumulation preventing plate is provided at the outer circumferential side downward of the crushing chamber, such an action can be provided, by which it is possible to prevent crushed pieces from being accumulated and remaining at the corners of the crushing chamber.

Since the drive portion is installed on the upper surface of the ceiling portion of the crushing chamber, the glass crushing machine has another action by which the drive portion can be made free from dust and dirt of the crushed glass.

Furthermore, since the powder and particle collecting chamber is provided with a funnel-like crushed substance collecting portion, it is easy to collect the crushed substances fallen from the pores of the porous bottom plate.

Still furthermore, since the glass crushing machine is provided with two or more crushing rollers having rows of square columns formed in duplicate on the outer circumference, it is possible to crush glass products such as glass bottles, etc. in a short time.

Furthermore, a glass crushing system according to the invention is provided with a glass crushing machine; a dust discharging port formed at the circumferential wall of a glass charging port of the glass crushing machine or at the ceiling portion of the crushing chamber; a dust collector connected to the dust discharging port; a glass charging conveyor connected to the upper part of the crushing chamber or to the glass charging port; a transfer conveyor connected to the crushed substance collecting portion of the glass crushing machine; and a particle size selector connected to the transfer conveyor.

With the abovementioned construction, it is possible to automatically charge glass products such as glass bottles, etc. into a crushing chamber and to automatically collect and classify the crushed substances in accordance with various particle sizes, whereby the crushing treatment capacity can be much improved.

As described above, the following excellent effects can be achieved by a glass crushing machine according to the invention and a glass crushing system using the same.

(1) Since a porous bottom plate is detachably attached between the crushing chamber and powder and particle collecting chamber, it is possible to replace the porous bottom plates to enable that the particle sizes of the crushed substances are changed, and glass products such as glass bottles, etc. can be crushed to various kinds of particle sizes by only one glass crushing machine. Therefore, it is very advantageous in use.

(2) by employing porous bottom plates of different pore diameters part by part in the crushing chamber since the porous bottom plate is divided into a plurality, it is possible to crush glass products to different particle sizes at a time, whereby the crushing efficiency of glass products such as glass bottles, etc. can be improved, and the same is very advantageous in use, too.

(3) Since a powder and particle accumulation preventing plate is disposed at the outer circumferential side of the crushing chamber, it is possible to prevent crushed pieces from being accumulated at the corners of the crushing chamber and to prevent the crushed pieces from remaining therein. Therefore, no maintenance and so on inside the crushing chamber is required, and a better efficiency can be held.

(4) It is possible to make the formation angle of the bottom plate of the crushed substance collecting portion smaller than the angle of rest of glass since a scraper or a vibrator is attached to a funnel-like crushed substance collecting portion. Therefore, the entirety of the machine can be made compact, and it is possible to easily collect the crushed substances fallen from the pores of the porous bottom plate.

(5) Since the crushing chamber is provided with two or more crushing rollers having crushing elements consisting of rows of square columns formed in duplex rows at a phase differential of 15° to 45° on the outer circumferential surface, it is possible to crush glass products such as glass bottles, etc., and possible to remarkably shorten the working time required for crushing. Furthermore, the crushing efficiency is excellent.

(6) Since the drive portion is installed on the upper surface of the ceiling portion of the crushing chamber, the maintenance thereof is easy, resulting in a good maintenance efficiency of the crushing machine.

(7) By increasing the length of square column rows of the crushing elements in the rotation rotating shaft direction greater than the clearance between the respective adjacent crushing elements, it is possible to crush glass products such as glass bottles, etc. at any position of the crushing rollers with no crushed pieces accumulated in the crushing chamber. Therefore, an excellent crushing efficiency is secured.

(8) When charging glass products such as glass bottles, etc. into a crushing chamber or crushing the same in the crushing chamber, a dust collector connected to the dust discharge port is able to prevent the crushed particles and dust from being splashed, hereby improving the working environment. Furthermore, by employing a dust collector it is possible to prevent the drive portion from malfunctioning due to the crushed particles and dust. Therefore, the durability of the glass crushing machine can be much improved, in addition to having the operational hygiene of the machine improved.

(9) Since a crushed substance scraper is slidably brought into contact with the inner wall of the crushed substance collecting portion downward of the drive shaft, the crushed substance collecting scraper is able to rotate centering around the drive shaft in line with rotations of the drive shaft, so that the crushed substances fallen through the pores of the porous bottom plate can be collected without being left inside the inner wall of the crushed substance collecting portion, making the collecting property for the crushed substances excellent, and improving the working efficiency.

(10) By vibrating the sides of the crushed substance collecting portion by a vibrator, it is possible to quickly collect the crushed substances fallen from the porous bottom plate. Therefore, the collecting property for the crushed substances is excellent, and the working efficiency is much improved.

(11) Since the crushing rollers are rockably pivotally supported at the arm via a rocking shaft, the crushing roller can vertically rock on the porous bottom plate. Therefore, even though a great deal of glass products such as glass bottles, etc. are charged, the crushing roller can circumferentially turn and rotate for crushing so as to ride on the charged glass products such as glass bottles. The crushing efficiency is excellent.

(12) If a charging conveyor, transfer conveyor and particle size selector, etc. are connected to the corresponding glass crushing machine, the crushing work of glass products such as glass bottles, etc. can be automated to cause the working efficiency to be improved. Therefore, it is possible to crush such glass products in a short time.

(13) If a particle size selector is connected, it is possible to select crushed substances size by size when such glass products are crushed to various kinds of particle sizes. Therefore, the working efficiency is excellent.

(14) If a glass crushing system equipped with the corresponding glass crushing machine, a charging conveyor, transfer conveyor, particle size selector, etc. is installed on a deck, etc. of a vehicle such as a truck, etc., the corresponding glass crushing system can be moved to any place where a great deal of glass products such as glass bottles, etc. occur, for example, a sightseeing site, etc. Therefore, it is possible to crush and treat glass products at various places, and the use convenience thereof is excellent.

BRIEF DESCRIPTION OF THE DRAWINGS

Other features and advantages of the invention will be apparent from the following description taken in connection with the accompanying drawings wherein.

DETAILED DESCRIPTION OF THE PREFERRED EMBODIMENTS

Figure 1:
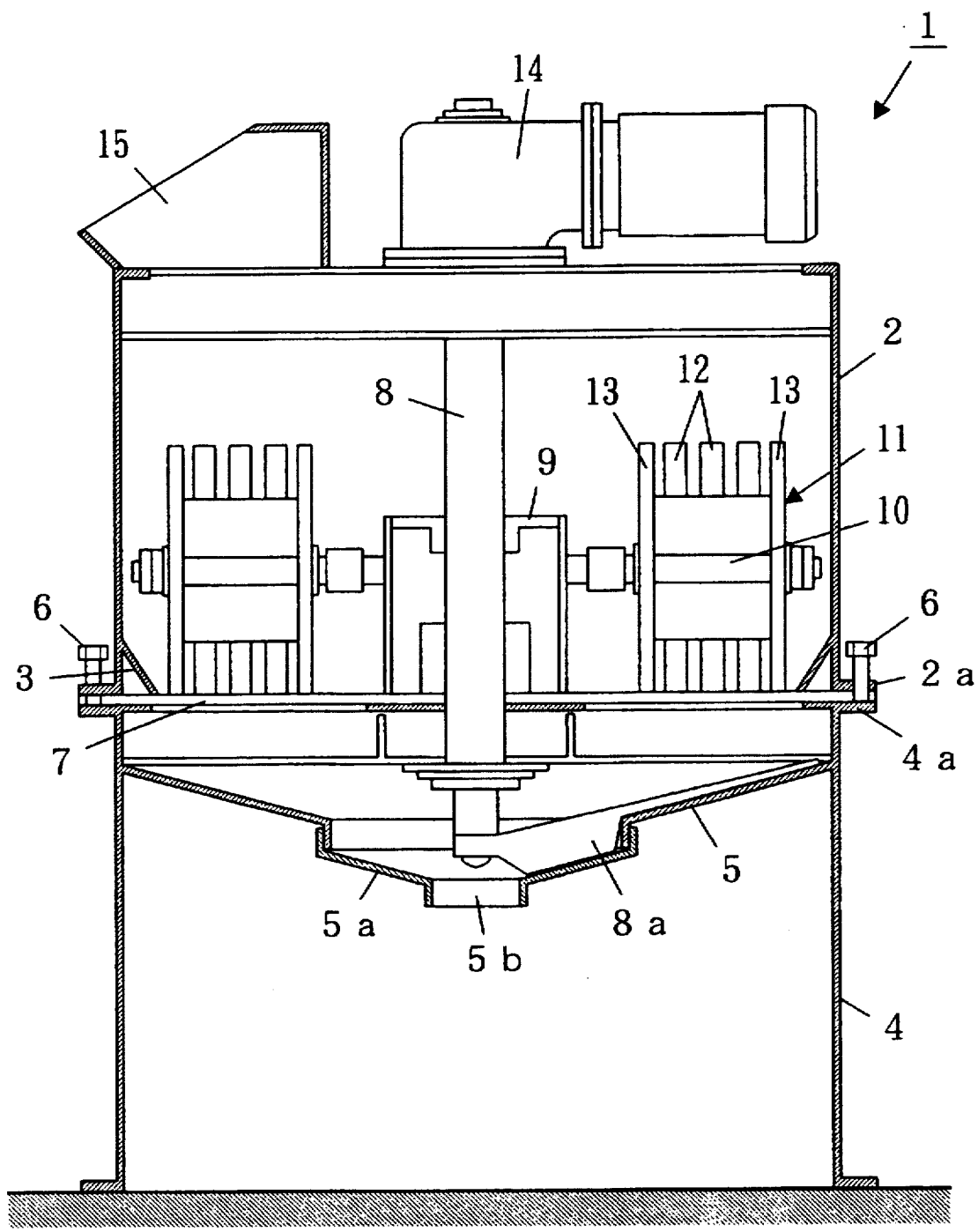
FIG. 1 is a cross-sectional view showing major parts of a glass crushing machine according to the first preferred embodiment.

A glass crushing machine according to the invention is constructed so as to be provided with a cylindrical crushing chamber; a powder and particle accumulation preventing plate, which is inclined and disposed at the inner wall at the downward outer circumferential side of the crushing chamber; a drive shaft disposed at a roughly middle portion of the crushing chamber and aligned with the axial direction of the crushing chamber; a drive portion connected to the drive shaft and disposed on the upper surface of the ceiling portion of the crushing chamber; a cylindrical powder and particle collecting chamber disposed downward of the crushing chamber; a supporting beam portion disposed upward of the powder and particle collecting chamber; a crushed substance collecting portion formed to be funnel-like and disposed downward of the supporting beam portion of the powder and particle collecting chamber; a height adjusting portion disposed in the crushing chamber and/or the powder and particle collecting chamber; a bottom plate insertion portion formed at the height adjusting portion between the crushing chamber and the powder and particle collecting chamber; a porous bottom plate which is detachably attached to the bottom plate insertion portion, is provided with a number of pores, and is divided into a plurality; two or more roller rotating shafts connected to the drive shaft via a connection means; two or more crushing rollers rotatably fitted to the roller rotating shafts; and crushing elements, consisting of rows of square columns, formed on the outer circumferential surface of the crushing rollers at a phase differential of 15° to 45°, preferably 20° to 40°, in a duplex state.

Thereby, the porous bottom plate can be easily replaced from the bottom plate insertion portion and it is possible to crush glass products such as glass bottles, etc. to any optional particle size. By arranging porous bottom plates having different pore diameters part by part, such an action can be secured, where it is possible to obtain crushed substances having different particle sizes at a time.

Furthermore, it is possible to prevent crushed substances from being accumulated at the corners of a crushing chamber by a powder and particle accumulation preventing plate, whereby it is possible to prevent the crushed substances from remaining in the crushing chamber.

Since the drive portion is installed on the upper surface of the ceiling part of the crushing chamber, such an action can be secured, by which it is possible to prevent bearings, rotary parts, etc. from being hindered due to dust and dirt.

Furthermore, since a funnel-like crushed substance collecting portion is provided, such an action can be secured, by which it is very easy to collect crushed substances fallen through the pores of the porous bottom plate.

Still furthermore, since the glass crushing machine is provided with two or more crushing rollers having crushing elements consisting of duplex rows of square columns at a phase differential of 15° to 45° on the outer circumferential surface, such an action can be secured, by which glass products such as glass bottles, etc. can be crushed in a short time.

Herein, in a case where a disk-like splash preventing portion having roughly the same periphery as that of the tip end of the square columnar rows formed on the outer circumferential surface of the crushing rollers is arranged at the inner and outer circumferential sides of the crushing rollers, it is possible to prevent glass pieces of glass products from being splashed onto the portions, having no square columnar rows, of the inner and outer circumferential sides of the crushing rollers. Furthermore, in a case where a scraper is arranged at the outer circumferential side of the drive shaft at the bottom of the crushing chamber, it is possible to prevent powder and particles from being accumulated in the vicinity of the drive shaft where no crushing roller passes.

Furthermore, a window and an openable lid may be disposed at the side walls of the crushing chamber, wherein it will be much easier to clean up the inside and to carry out maintenance.

Furthermore, it is preferable that the bottom plate of the crushed substance collecting portion is inclined to be funnel-like so as to have an inclination angle of 15° to 40°, favorably 20° to 30°. As the inclination angle is decreased to be smaller than 20°, it will get difficult for the crushed substances to fall downward of the crushed substance collecting portion, thereby causing the crushed substances to be apt to be accumulated on the bottom plate of the crushed substance collecting portion. To the contrary, as the inclination is increased to be bigger than 30°, the dimensions of the crushed substance collecting portion in its height direction will be made large-sized to cause the system itself to be made bigger. Either of the cases is unfavorable.

Furthermore, if an opening for discharging crushed substances is provided below the crushed substance collecting portion and is provided with a lid, it is possible to accommodate crushed substances in the crushed substance collecting portion, and if a transfer conveyor, etc. is attached to the opening, it is possible to convey of the crushed substances to another equipment or other places.

Still furthermore, as regards crushing elements, if the interval between the respective crushing elements is made too narrow as the phase differential is decreased to be smaller than 20°, it will be difficult for large glass products to be treated by the crushing elements, thereby causing the crushing efficiency to be is lowered. Since the interval between the respective crushing elements is widened too much as the phase differential exceeds 40°, such a tendency occurs, where the crushing efficiency will be lost. Either of the cases is unfavorable.

A glass crushing machine according to the invention is constructed so that the length of one side of the rows of square columns of the crushing elements in the roller rotating shaft direction is formed to be longer than the clearance between the crushing elements adjacent to each other in the roller rotating shaft direction.

Thereby, it is possible to crush glass products such as glass bottles, etc. at any position in the rotating shaft direction of the crushing rollers, and such an action can be obtained, where crushed substances can be prevented from being accumulated in the crushing chamber.

A glass crushing machine according to the invention is constructed so that a dust discharging port to which a dust collector is connected in an airtight state is provided at a glass charging port disposed to be open at the ceiling portion of the crushing chamber.

Thereby, when charging glass products such as glass bottles, etc., into the crushing chamber and crushing glass products such as glass bottles, etc., in the crushing chamber, it is possible to prevent the working environment from being worsened due to splashing of dust and dirt, and further such an action can be secured, where it is possible to prevent the drive portion, etc. from malfunctioning due to the dust and dirt.

Herein, as regards a dust collector, a simplified dust collector is installed around the corresponding glass crushing machine and may be connected to the dust discharging port, which is formed at the upper part or at the ceiling part of the crushing chamber, via a duct, etc.

A glass crushing machine according to the invention is constructed so that a crushed substance collecting scraper, which is slidably connected to the inner wall of the crushed substance collecting portion, is disposed beneath the drive shaft.

Thereby, since the crushed substance collecting scraper can rotate centering around the drive shaft in line with rotations of the drive shaft, such an action can be secured, where the crushed substances fallen through pores of the porous bottom plate can be collected without remaining on the bottom plate of the crushed substance collecting portion.

A glass crushing machine according to the invention is constructed so that a vibrator for causing glass particles to flow down by vibrating a wall surface is provided at the outer circumferential surface of the crushed substance collecting portion.

Thereby, since the vibrator can vibrate the sides of the crushed substance collecting portion, such an action can be secured, where crushed substances fallen through pores of the porous bottom plate can be quickly collected.

A glass crushing machine according to the invention is constructed so that the connection means is provided with a supporting shaft connected to the drive shaft, an arm fixed at the supporting shaft orthogonally thereto, and a rocking shaft rockably and pivotally supported at the arm orthogonally to the arm and the roller rotating shaft.

Thereby, since the crushing rollers can vertically rock on the porous bottom plate by the rocking shaft centering around the arm, the crushing rollers can circumferentially turn and rotate while riding on and crushing glass products such as glass bottles, etc. charged into the crushing chamber. Therefore, even though a great number of glass products such as glass bottles, etc., are charged at a time, such an action can be secured, where they can be quickly crushed.

A glass crushing system according to the invention comprises a glass crushing machine; a dust discharging port formed at the circumferential wall of a glass charging port of the glass crushing machine or at the ceiling portion of the crushing chamber; a dust collector connected to the dust discharging port; a glass charging conveyor connected to the upper part of the crushing chamber or to the glass charging port; a transfer conveyor connected to the crushed substance collecting portion of the glass crushing machine; and a particle size selector connected to the transfer conveyor.

Thereby, it is possible to automatically charge glass products such as glass bottles, etc., into the crushing chamber and to automatically collect and classify the crushed substances in accordance with particle sizes. Such an action can be achieved, where the crushing treatment capacity can be much improved. Still furthermore, such an action can be also provided, where when crushing glass bottles, etc., into different particle sizes at a time, it is possible to automatically classify them according to particle sizes.

Furthermore, in a case where the corresponding glass crushing system is installed on the deck of truck, etc., such an action can be secured, where it is possible to convey the corresponding glass crushing system anywhere you like, and glass products such as glass bottles, etc. can be crushed and treated at various places.

Herein, as regards a charging conveyor, a bucket conveyor, inclination conveyor, etc. may be used. A screw conveyor may be used as a transfer conveyor, etc.

A sphering apparatus may be connected to a transfer conveyor in addition to a particle size selector.

Embodiment 1

Hereinafter, a description will be given of a first preferred embodiment of a glass crushing machine according to the invention with reference to the drawings.

Figure 2:
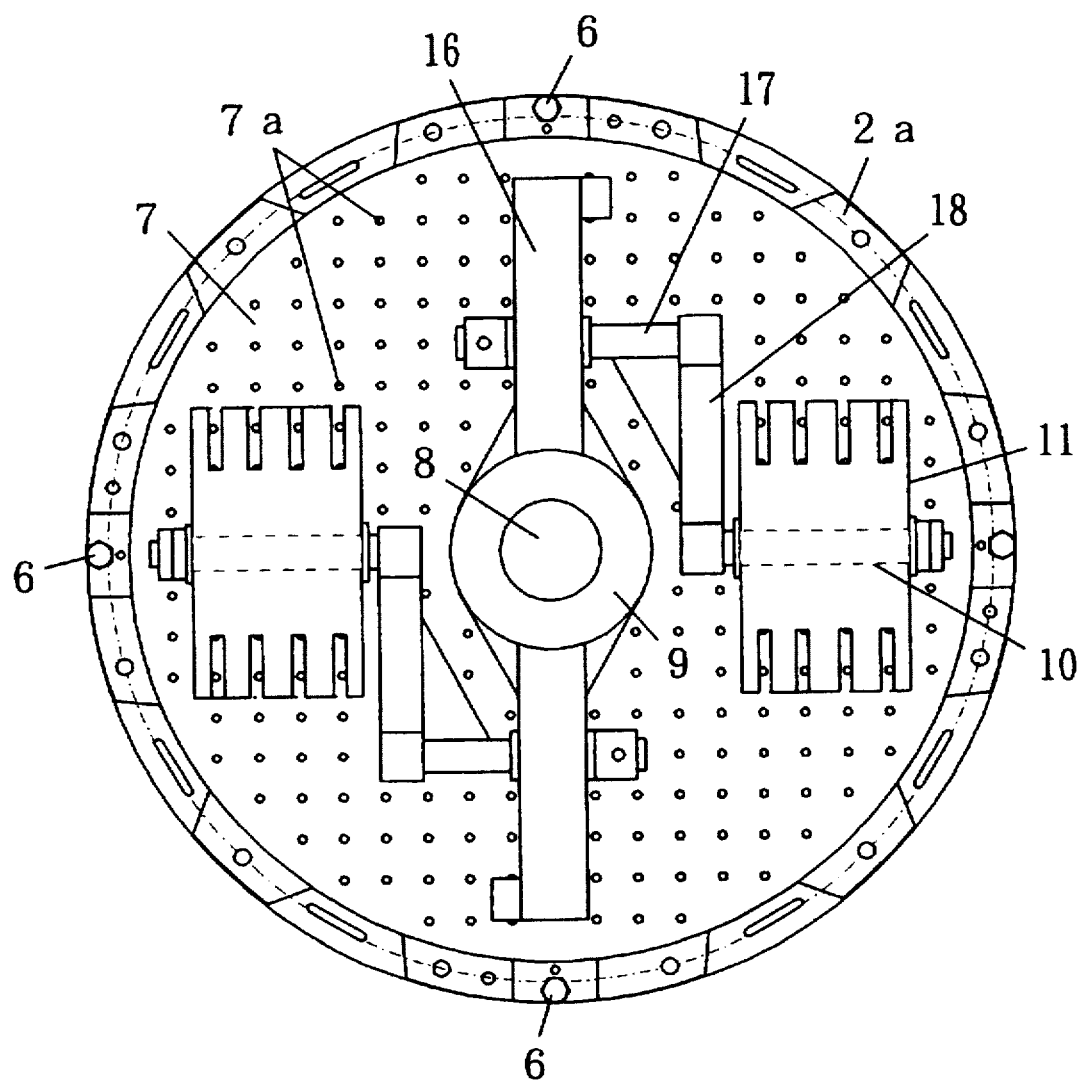
FIG. 2 is a plan view showing major parts of a crushing chamber of a glass crushing machine according to the first preferred embodiment FIG. 3($a$) is a cross-sectional view of major parts of a crushing roller, and FIG. 3($b$) is a developed view of the outer circumferential surface of the crushing roller.

FIG. 1 is a cross-sectional view showing major parts of a glass crushing machine according to the first preferred embodiment, and FIG. 2 is a plan view showing major parts of a crushing chamber of a glass crushing machine according to the first preferred embodiment.

In FIG. 1, 1 is a glass crushing machine according to the first preferred embodiment, 2 is a crushing chamber formed to be cylindrical, of the glass crushing machine. 2a is a crushing chamber side clearance adjusting portion, which is formed at the lower part of the outer circumference of the crushing chamber 2 and maintains the clearance between the crushing chamber 2 and the powder and particle collecting chamber described later. 3 is a powder and particle accumulation preventing plate disposed and inclined at the lower part of the inner wall at the outer circumferential side downward of the crushing chamber 2. 4 is a powder and particle collecting chamber formed to be cylindrical, which is disposed downward of the crushing chamber 2. 4a is a collecting chamber side clearance adjusting portion projected above of the outer circumference of the powder and particle collecting chamber 4. 5 is a crushed substance collecting portion which is disposed in the powder and particle collecting chamber 4 and is formed to be funnel-like so that the side inclination angle is an angle of 15° to 40° smaller than the angle of rest of glass. 5a is a lower-part collecting portion detachably and attachably disposed downward of the crushed substance collecting portion 5. 5b is a discharge opening of crushed substances, which is formed downward of the lower-part collecting portion 5a. 6 is a height adjusting portion disposed at the crushing chamber side clearance adjusting portion 2a and consists of bolts, etc. for adjusting the clearance between the crushing chamber 2 and the powder and particle collecting chamber 4. 7 is a porous bottom plate detachably and attachably disposed between the crushing chamber 2 and the powder and particle collecting chamber 4 and is divided into four sections having a number of pores. 8 is a drive shaft provided at a roughly middle part of the crushing chamber 2 in the same direction of the axial line of the crushing chamber 2. 8a is a crushed substance collecting scraper, one end of which is fixed at the lower tip end of the drive shaft 8, disposed so that the blade thereof is slidably brought into contact with the inner wall of the crushed substance collecting portion 5 and the lower-part collecting portion 5a. 9 is a housing portion disposed at the outer circumference of the drive shaft 8 and connected thereto. 10 is a roller rotating shaft connected to the housing portion 9 via a connection means, 11 is a crushing roller rotatably fitted to the roller rotating shaft 10. 12 is a crushing element consisting of rows of square columns formed in a duplex state with a phase differential of 30° on the outer circumferential surface of the crushing roller 11. 13 is a splash preventing portion which is formed to be disk-like on the outer and inner circumferential sides of the crushing roller 11 and is used for preventing glass pieces from being splashed. 14 is a drive portion connected to the drive shaft 8 and disposed on the upper surface of the ceiling portion of the crushing chamber 2. 15 is a charging port of glass products such as glass bottles, etc., which is open to the ceiling of the crushing chamber 2.

In FIG. 2, 7a are a number of pores formed at the porous bottom plate 7, 16 is a supporting shaft connected to the drive shaft 8, 17 is an arm fixed orthogonally to the supporting shaft 16, 18 is a rocking shaft orthogonal to the arm 17 and roller rotating shaft 10 and pivotally supported on the arm 17 so as to be rockable.

Next, a description will be given of the crushing roller 11 with reference to the drawings.

Figure 3:
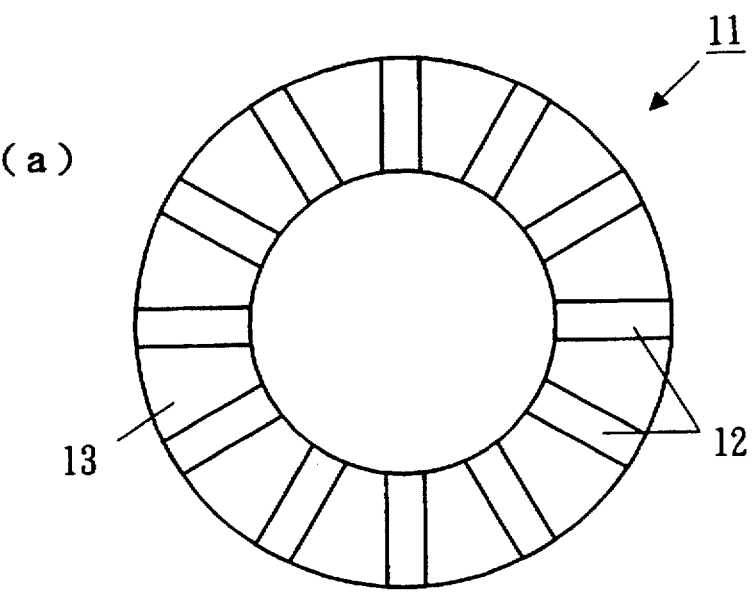
Figure 3:
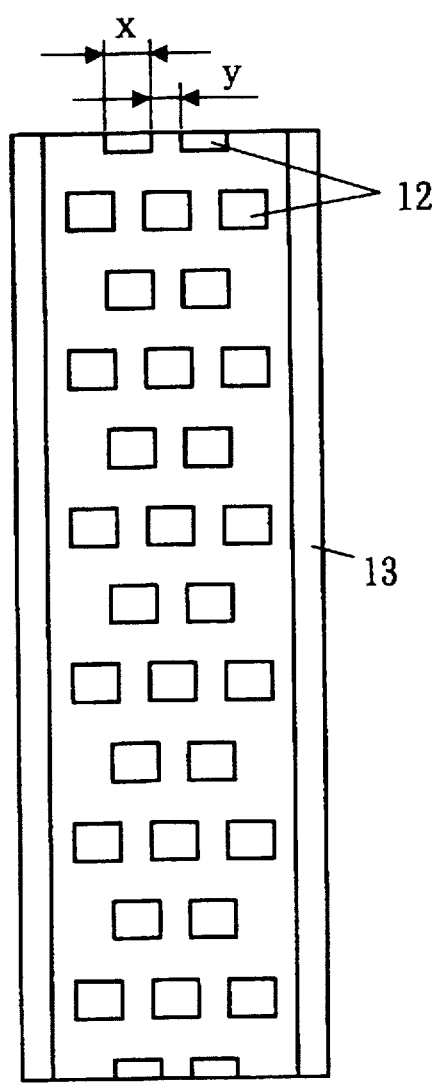

FIG. 3(a) is a cross-sectional view of major parts of the crushing roller. FIG. 3(b) is an developed view of the outer circumference of the crushing roller.

In the drawings, x is a length of a crushing element 12 in the roller rotating shaft direction, y is a width of the clearance of the adjacent crushing elements 12 in the roller rotating shaft direction.

Furthermore, the respective crushing elements 12 are formed so that the width y of the clearance part is made shorter than the length x of the crushing elements 12.

Next, a description will be given of actions of a glass crushing machine 1 according to the first preferred embodiment.

In line with rotations of the drive shaft 8 by the drive portion 14, the supporting shaft 16 connected to the drive shaft 8 is caused to rotate centering around the drive shaft 8, and the crushing roller 11 circumferentially turns around the drive shaft 8. Furthermore, the crushing roller 11 is caused to rotate centering around the roller rotating shaft 10 in line with the circumferential turn.

As glass products such as glass bottles, etc. are charged through the charging port 15 into the crushing chamber 2, the crushing elements 12 of the crushing roller 11 ride on and crush the charged glass products such as glass bottles, etc. by circumferential turn and rotation of the crushing roller 11. Furthermore, since the crushing roller 11 is pivotally supported at the arm 17 so as to be rockable by the rocking shaft 18, the crushing roller 11 vertically moves on the porous bottom plate 7 centering around the arm 17, and in a case where a great deal of glass products such as glass bottles, etc. are charged, the crushing roller 11 circumferentially turns and rotates to crush the glass products such as glass bottles, etc. while they are riding on the charged glass products such as glass bottles, etc.

After the glass products such as glass bottles, etc. charged into the crushing chamber 2 are crushed to the sizes of pores 7a of the porous bottom plate 7, the crushed substances fall down into the crushed substance collecting portion 5 through the pores 7a of the porous bottom plate 7. Furthermore, the crushed substance collecting scraper 8a rotates centering around the drive shaft 8 in line with the rotations of the drive shaft 8 and collects the crushed substances fallen into the crushed substance collecting portion 5 downward of the lower part collecting portion 5a.

Furthermore, in a case where a lid is provided at the discharge opening 5b formed downward of the lower part collecting portion 5a, it is possible to accumulate the crushed substances in the lower part collecting portion 5a, and in a case where a screw conveyor, etc. is connected to the discharge opening 5b, the crushed substances fallen into the lower part collecting portion 5a can be conveyed to other collecting cases or apparatuses.

Next, a description will be given of the porous bottom plate 7 of a glass crushing machine 1 according to the first preferred embodiment 1 with reference to a drawing.

Figure 4:
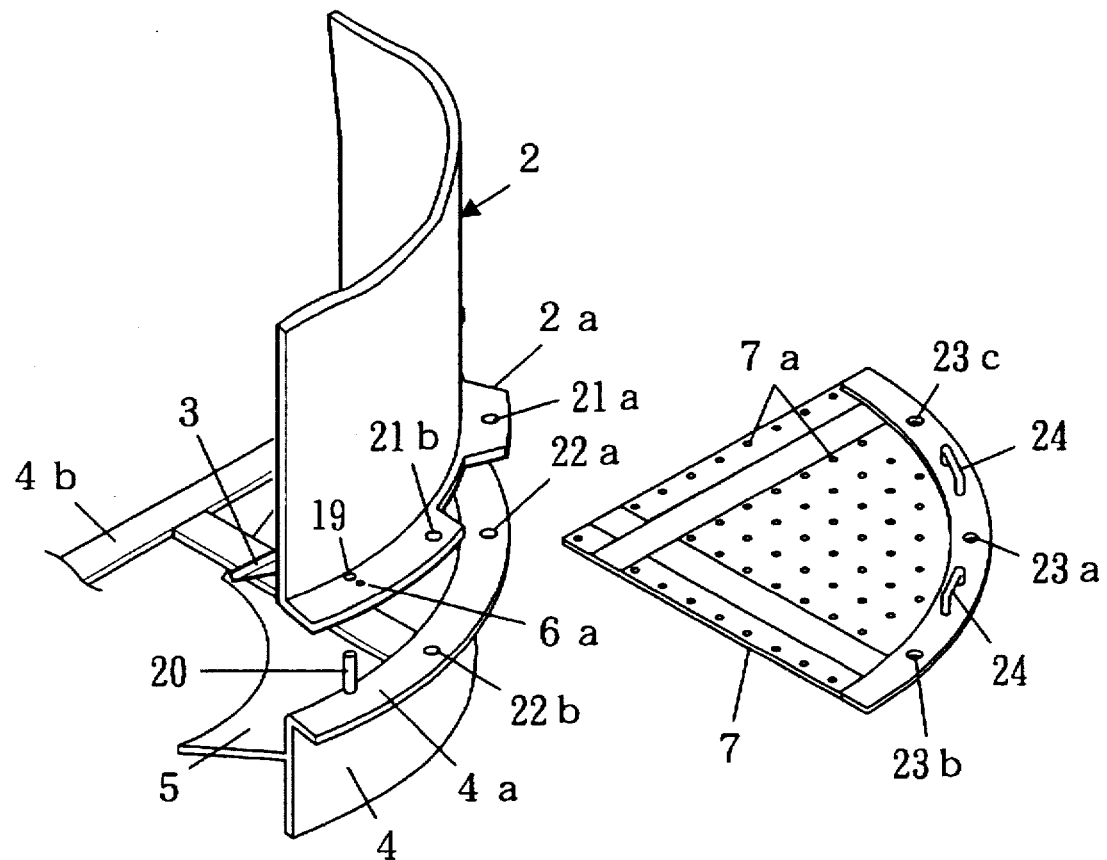
FIG. 4 is a disassembled perspective view of major parts of the portion at which a porous bottom plate according to the first preferred embodiment is disposed.

FIG. 4 is a disassembled perspective view of major parts of the disposed place of the porous bottom plate of the first preferred embodiment 1.

In the drawing, 4b is a supporting beam portion disposed above the powder and particle collecting chamber 4, 6a is a threaded bore into which a bolt of the height adjusting portion 6 is screwed. 19 is a positioning hole drilled at the crushing chamber side clearance adjusting portion 2a. 20 is a positioning rod protruding from the collecting chamber side clearance adjusting portion 4a. 21a and 21b are fixing holes formed at the crushing chamber side clearance adjusting portion 2a. 22a and 22b are fixing holes formed at the collecting chamber side clearance adjusting portion 4a. 23a, 23b and 23c are fixing holes formed at the outer circumferential side of the porous bottom plate 7, and 24 is a gripping portion disposed at the outer circumferential side of the porous bottom plate 7.

Hereinafter, a description will be given of detaching and attaching of the porous bottom plate 7.

A bolt of the height adjusting portion 6 is screwed from above into the threaded bore 6a formed at the crushing chamber side clearance adjusting portion 2a of the crushing chamber 2, and the positioning rod 20 protruding at the collecting chamber side clearance adjusting portion 4a is inserted into the positioning hole 19 drilled at the crushing chamber side clearance adjusting portion 2a. The crushing chamber 2 is secured above the powder and particle collecting chamber 4, and the clearance between the crushing chamber 2 and the powder and particle collecting chamber 4 is adjusted by the bolt of the height adjusting portion 6 to such a clearance where a porous bottom plate 7 can be inserted into.

Next, the porous bottom plate 7 is inserted into the clearance secured by the bolt of the height adjusting portion 6 between the crushing chamber 2 and the powder and particle collecting chamber 4, and the fixing holes 23a and 23b formed at the porous bottom plate 7 are respectively aligned into the fixing holes 22a and 22b formed at the collecting chamber side clearance adjusting portion 4a of the powder and particle collecting chamber 4 and the fixing holes 21a and 21b formed at the crushing chamber side clearance adjusting portion 2a of the crushing chamber 2, wherein by adjusting the bolt screwed into the threaded bore 6a, the crushing chamber side clearance adjusting portion 2a is brought into contact with the porous bottom plate 7, and bolts (not illustrated) are penetrated through the fixing holes 21a, 23a, 22a and the fixing holes 21b, 23b and 22b and are fixed with nuts (not illustrated).

In a case where the porous bottom plate 7 is replaced, bolts which are penetrated through the fixing holes 21a, 23a, 22a and fixing holes 21b, 23b and 22b and fixed therein are removed, the bolt of the height adjusting portion 6, which is screwed into the threaded bore 6a, is adjusted, and a clearance is secured between the crushing chamber side clearance adjusting portion 2a and the porous bottom plate 7, whereby the porous bottom plate 7 is pulled out by the gripping portion 24 and another porous bottom plate is inserted between the crushing chamber side clearance adjusting portion 2a and the collecting chamber side clearance adjusting portion 4a for replacement. By adjusting the bolt screwed into the threaded bore 6a, the crushing chamber side clearance adjusting portion 2a is caused to be brought into contact with the replaced porous bottom plate, wherein the crushing chamber side clearance adjusting portion 2a, the replaced porous bottom plate and the collecting chamber side clearance adjusting portion 4a are fixed to each other by bolts and nuts.

Furthermore, the porous bottom plate may be divided into not only four sections but also a plurality of sections, for example, three sections, etc. Still furthermore, in a case where porous bottom plates have different pore sizes per section is provided, it is possible to obtain crushed substances having different particle sizes at a time.

Since a glass crushing machine according to the first preferred embodiment is constructed as described above, the following actions can be provided.

The crushing roller is able to circumferentially turn around the drive shaft by causing the drive shaft to rotate at the drive portion and simultaneously the crushing roller is able to rotate centering around the roller rotating shaft, such an action can be obtained, where glass products such as glass bottles, etc. charged into the crushing chamber can be crushed by rows of square columns of the crushing roller.

Furthermore, since the crushing roller are rockably pivotally supported at the arm via a rocking shaft, the crushing roller is able to vertically move on the porous bottom plate. Therefore, even though a great deal of glass products such as glass bottles, etc. are charged, such an action can be secured, where the crushing roller is able to circumferentially turn and rotate so as to ride on glass products such as glass bottles, etc., they can be effectively crushed.

Furthermore, such an action can be obtained, where the porous bottom plate can be easily replaced by pulling out the same through the side of the corresponding glass crushing machine. Still furthermore, if porous bottom plates having different pore sizes are attached since the porous bottom plate is divided into a plurality, such an action can be obtained, where glass products such as glass bottles, etc. can be crushed at a time so as to have different particle sizes.

Since the drive portion is disposed upward of the crushing chamber, dust and dirt are hardly applied to the drive portion, and it is easy to carry out maintenance of the drive portion.

Furthermore, since a splash preventing portion is formed at the outer and inner circumferential side of the crushing roller, such an action can be obtained, crushed pieces of glass are prevented from being splashed to the outside of the crushing roller, where no crushing elements are provided, when crushing glass products such as glass bottles, etc.

Furthermore, since the length of crushing elements formed in duplex rows with a phase differential of 30° on the outer circumferential surface of the crushing roller in the roller rotating shaft direction is longer than the clearance portion between the respective adjacent crushing elements, such an action is provided, where crushing can be carried out at any position where the crushing roller passes.

Furthermore, since a powder and particle accumulation preventing plate is disposed at the outer circumferential side of the crushing chamber, such an action is provided, where crushed pieces of glass are prevented from being accumulated at the corners in the crushing chamber.

Still furthermore, the powder and particle collecting scraper is able to rotate centering around the drive shaft in line with rotations of the drive shaft, crushed substances fallen through the pores of the porous bottom plate can be collected without being accumulated at the inner walls of the crushed substance collecting portion.

Preferred Embodiment 2

Hereinafter, a description will be given of a glass crushing system in which a charging conveyor and transfer conveyor are connected to a crushing machine, according to a second preferred embodiment, which is installed on the deck, etc. of a vehicle such as a truck, with reference to drawings.

Figure 5:
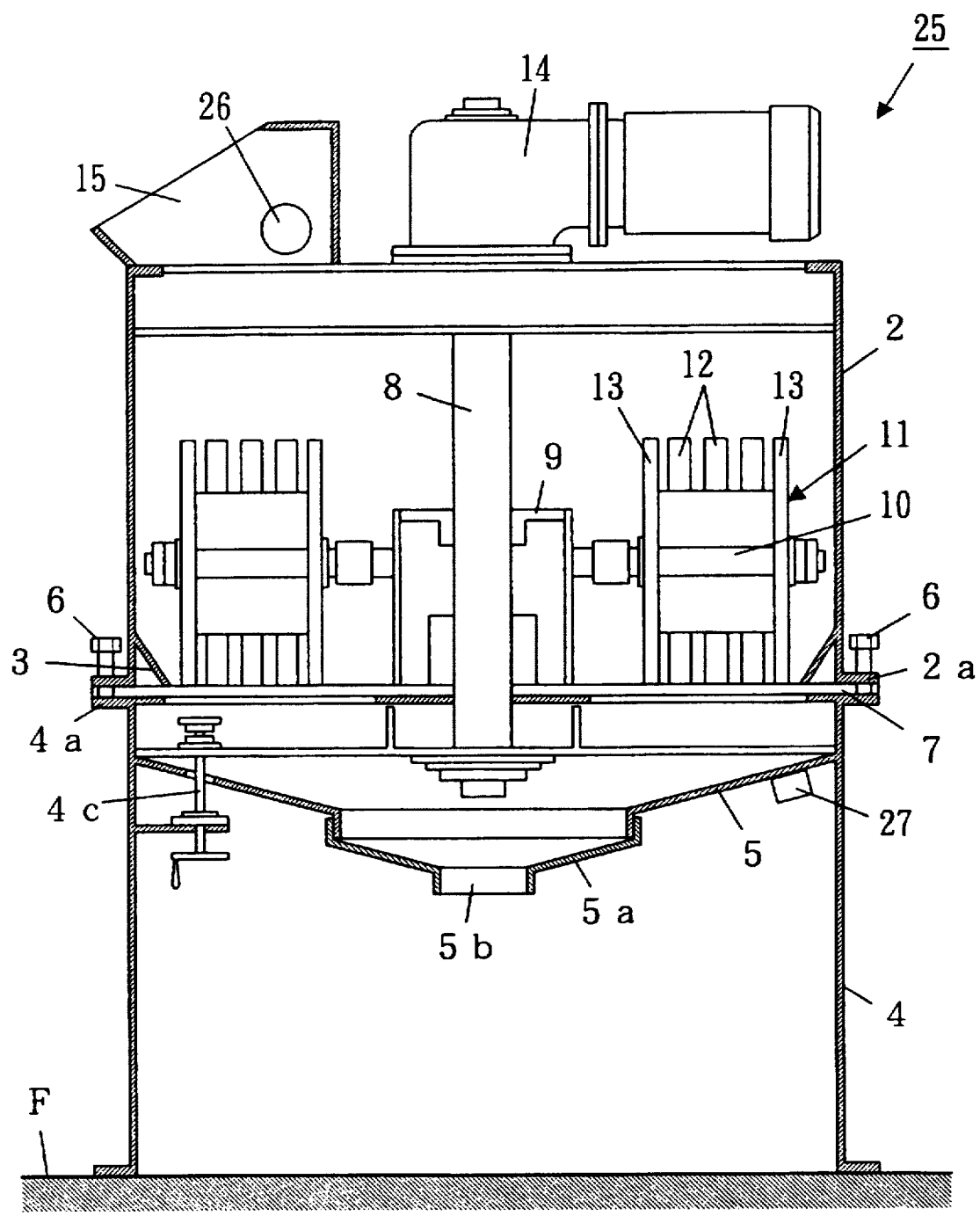
FIG. 5 is a cross-sectional view showing major parts of a glass crushing machine according to the second preferred embodiment.
Figure 6:
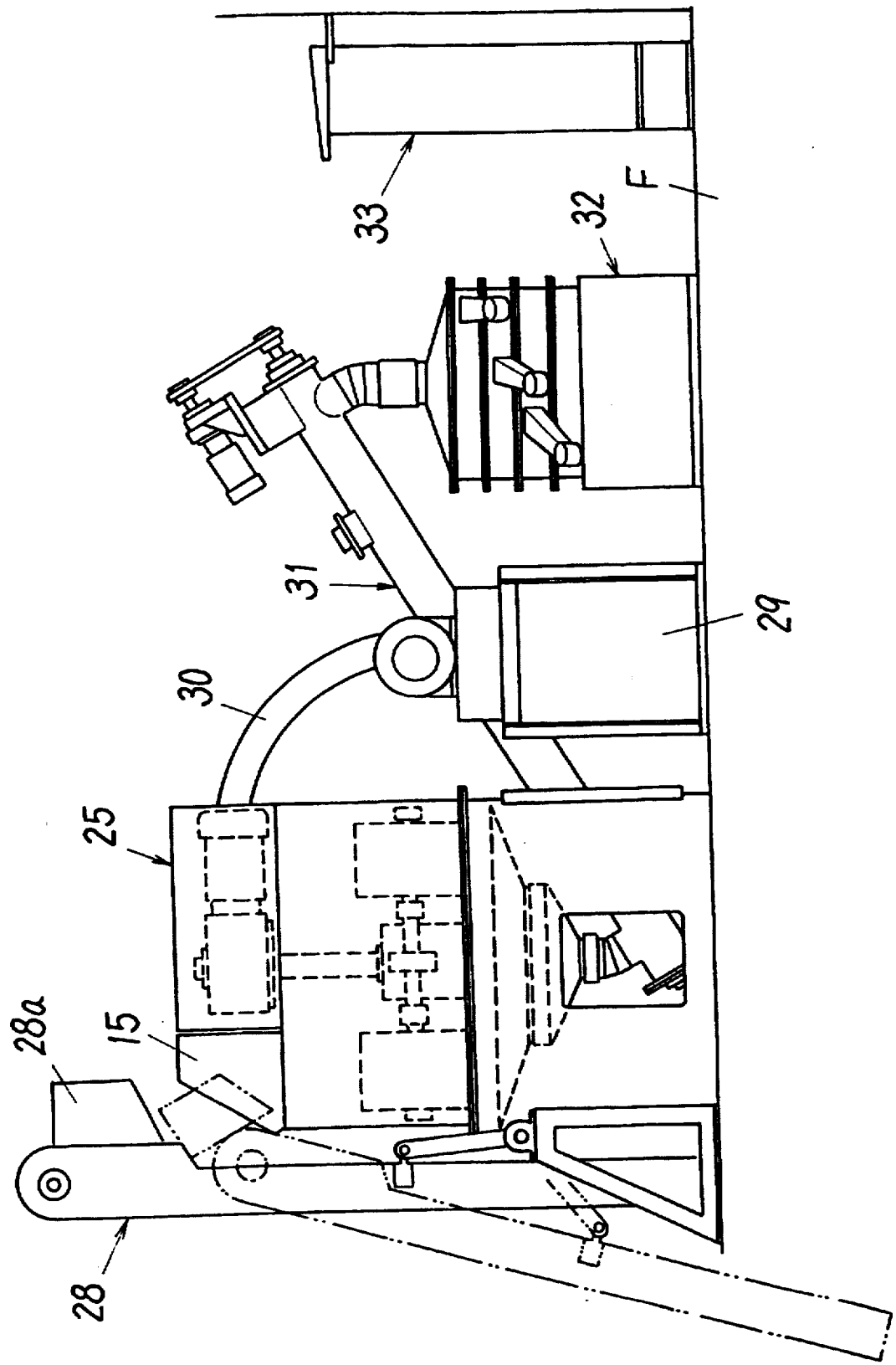
FIG. 6 is a aside elevational view showing the entirety of a glass crushing system according to the second preferred embodiment.
Figure 7:
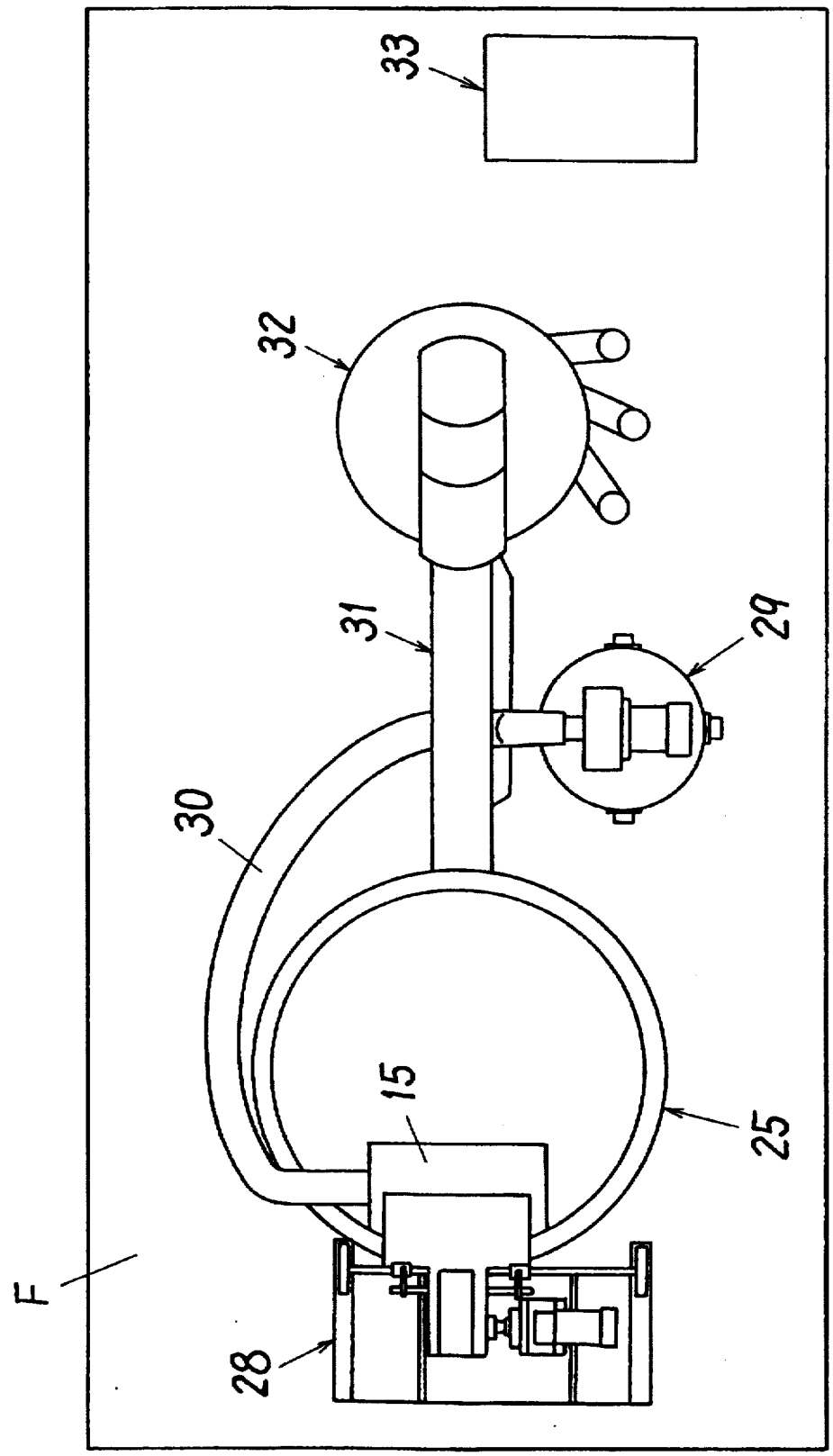
FIG. 7 is a plan view of the entirety of a glass crushing system according to the second preferred embodiment.

FIG. 5 is a cross-sectional view of major parts showing a glass crushing machine according to the second preferred embodiment, FIG. 6 is a side elevational view showing the entirety of a glass crushing system according to the second preferred embodiment, and FIG. 7 is a plan view showing the entirety of a glass crushing system according the second preferred embodiment, wherein the parts which are identical to those in the first preferred embodiment are given the same reference numbers, and the description thereof is omitted.

In the drawings, 4c is a horizontal supporting portion. 25 is a glass crushing machine installed on the deck F of a vehicle, etc. such as a truck 26 is a dust discharge port formed at the side wall of the charging port 15, to which a dust collector is connected in an airtight state. 27 is a vibrator which is disposed at the outer circumferential surface of the crushed substance collecting portion 5 and causes glass particles to flow down. 28 is a bucket type charging conveyor for charging glass products such as glass bottles, etc. into the charging port 15 of the glass crushing machine 25. 28a is a bucket of the charging conveyor 28. 29 is a suction type dust collector connected to the glass crushing machine 25. 30 is a duct which connects a dust discharge portion 26 formed at the side of the charging port 15 of the glass crushing machine 25 to the dust collector 29. 31 is a screw type transfer conveyor connected to the discharge opening 5b formed at the lower part of the lower part collecting portion 5a of the glass crushing machine 25. 32 is a particle size selector for selecting the particle sizes of crushed substances, which is connected to the transfer conveyor 31. 33 is a control portion of the glass crushing machine 25, charging conveyor 28, dust collector 29, transfer conveyor 31, and particle size selector 32.

Furthermore, the charging conveyor 28, dust collector 29, transfer conveyor 31, particle size selector 32 and control portion 33 are installed on the deck F of a vehicle such as a truck, etc.

Hereinafter, a description is given of actions of the glass crushing system constructed as in the second preferred embodiment described above.

A charging conveyor 28 installed on the deck F of a vehicle such as a truck, etc. is set to the charging port 15 of a glass crushing machine 25 as shown in FIG. 6, and the dust collector 29 is started. Glass products to be crushed such as glass bottles, etc. are placed in the bucket 28a and are conveyed to the charging port 15 of the glass crushing machine 25 by the charging conveyor 28, wherein they are charged in the glass crushing machine 25.

Next, crushed glass substances as in the first preferred embodiment fall down to the crushed substance collecting portion 5 through the pores 7a of the porous bottom plate 7, and the wall of the crushed substance collecting portion 5 is vibrated by the vibrator 27, whereby the fallen crushed substances are collected in the lower part collecting portion 5a.

Next, crushed substances collected by the lower part collecting portion 5a are conveyed to the particle size selector 32 by screws of the transfer conveyor 31 connected to the discharge opening 5b, and the crushed substances are selected size by size.

Still furthermore, the glass crushing machine 25, charging conveyor 28, dust collector 29, transfer conveyor 31 and particle size selector 32 are controlled by the control portion 33.

Since a glass crushing system according to the second preferred embodiment is constructed as described above, the same has the following actions.

Since a dust collector is connected to the dust discharge port of a glass crushing machine, such an action can be secured, where it is possible to collect dust and dirt generating when charging glass products such as glass bottles, etc., through the charging port, without being splashed to the surroundings, and the environment can be kept clean and sanitary.

Furthermore, since a vibrator is provided on the outer circumferential side of the crushed substance collecting portion, such an action can be secured, where it is possible to quickly collect crushed substances fallen to the crushed substance collecting portion by vibrating the crushed substance collecting portion. By providing the glass crushing machine with a vibrator, it is possible to arrange the walls of the crushed substance collecting portion at a smaller angle than the angle of rest of glass. As a result, such an action can be secured, where it is possible to lower the height of the crushed substance collecting chamber and to make the entire system compact.

Furthermore, charging of glass products such as glass bottles, etc. and transfer of crushed substances can be automatically performed by a charging conveyor and transfer conveyor, whereby it is advantageous to improve the treatment capacity of crushing.

Still furthermore, in a case where glass products are crushed to various kinds of particle sizes by employing porous bottom plates of different pore diameters, it is possible to select the particle sizes of crushed substances by a particle size selector and it is possible to quickly collect the crushed substances size by size.

Since a glass crushing system is installed on the deck of a vehicle such as a truck, etc., it is possible to carry the system to any place where crushing of glass products is required, such an action is obtained, where crushing treatments of glass products can be carried out at various places.

What is claimed is:

1. A glass crushing machine comprising:
   a cylindrical crushing chamber;
   a powder and particle accumulation preventing plate, which is inclined and disposed at an inner wall at a downward outer circumferential side of said crushing chamber;
   a drive shaft disposed at a roughly middle portion of said crushing chamber and aligned with an axial direction of said crushing chamber;
   a drive portion connected to said drive shaft and disposed on an upper surface of a ceiling portion of said crushing chamber;
   a powder and particle collecting chamber disposed downward of said crushing chamber;
   a supporting beam portion disposed upward of said powder and particle collecting chamber;
   a crushed substance collecting portion formed to be funnel shaped and disposed downward of said supporting beam portion of said powder and particle collecting chamber;
   a height adjusting portion attached to at least one of said crushing chamber and said powder and particle collecting chamber;
   a bottom plate insertion portion formed by said height adjusting portion between said crushing chamber and said powder and particle collecting chamber;
   a porous bottom plate which is detachably attached to said bottom plate insertion portion, provided with a number of pores and divided into a plurality of sections;
   two or more roller rotating shafts connected to said drive shaft via a connection means;
   two or more crushing rollers rotatably fitted to said roller rotating shafts; and
   crushing elements, consisting of rows of square columns, formed on the outer circumferential surface of said crushing rollers at a phase differential of 15° to 45°, in a duplex state and cooperating with said porous bottom plate to crush material therebetween.

2. The glass crushing machine as set forth in claim 1, wherein a length of one side of said rows of square columns of said crushing elements in an axial direction of said roller rotating shaft is formed to be longer than a clearance between said crushing elements adjacent to each other in said axial direction of said roller rotating shaft.

3. The glass crushing machine as set forth in claim 1 or 2, wherein a dust discharging port to which a dust collector is connected in an airtight state is provided at a glass charging port disposed to be open at the ceiling portion of said crushing chamber.

4. The glass crushing machine as set forth in any one of claims 1 to 2, wherein a crushed substance collecting scraper, which is slidably connected to an inner wall of said crushed substance collecting portion, is disposed beneath said drive shaft.

5. The glass crushing machine as set forth in any one of claims 1 to 2, wherein a vibrator for causing glass particles to flow down by vibrating a wall surface is provided at an outer circumferential surface of said crushed substance collecting portion.

6. The glass crushing machine as set forth in any one of claims 1 to 2, wherein said connection means is provided with a supporting shaft connected to said drive shaft, an arm fixed at said supporting shaft orthogonally thereto, and a rocking shaft rockably and pivotally supported at said arm orthogonally to said arm and said roller rotating shaft.

7. The glass crushing machine as set forth in claim 1, wherein said crushing elements are formed on the outer circumferential surface of said crushing roller and are at a phase differential of 20 to 40 degrees.

8. A glass crushing system comprising:

a cylindrical crushing chamber;

a powder and particle accumulation preventing plate, which is inclined and disposed at an inner wall at a downward outer circumferential side of said crushing chamber;

a drive shaft disposed at a roughly middle portion of said crushing chamber and aligned with an axial direction of said crushing chamber;

a drive portion connected to said drive shaft and disposed on an upper surface of a ceiling portion of said crushing chamber;

a powder and particle collecting chamber disposed downward of said crushing chamber;

a supporting beam portion disposed upward of said powder and particle collecting chamber;

a crushed substance collecting portion formed to be funnel shaped and disposed downward of said supporting beam portion of said powder and particle collecting chamber;

a height adjusting portion attached to at least one of said crushing chamber and said powder and particle collecting chamber;

a bottom plate insertion portion formed by said height adjusting portion between said crushing chamber and said powder and particle collecting chamber;

a porous bottom plate which is detachably attached to said bottom plate insertion portion, provided with a number of pores and divided into a plurality of sections;

two or more roller rotating shafts connected to said drive shaft via a connection means;

two or more crushing rollers rotatable fitted to said roller rotating shafts;

crushing elements, consisting of rows of square columns, formed on the outer circumferential surface of said crushing rollers at a phase differential of 15° to 45°, in a duplex state and cooperating with said porous bottom plate to crush material therebetween;

a dust discharging port formed at one of a circumferential wall of a glass charging port of said glass crushing machine and the ceiling portion of said crushing chamber;

a dust collector connected to said dust discharging port;

a glass charging conveyor connected to one of an upper part of said crushing chamber and said glass charging port;

a transfer conveyor connected to the crushed substance collecting portion of said glass crushing machine; and a particle size selector connected to said transfer conveyor.

9. The glass crushing machine as set forth in claim 7, wherein said crushing elements are formed on the outer circumferential surface of said crushing roller and are at a phase differential of 20 to 40 degrees.

10. A glass crushing machine comprising:

a cylindrical crushing chamber;

a powder and particle accumulation preventing plate, which is inclined and disposed at an inner wall at a downward outer circumferential side of said crushing chamber;

a drive shaft disposed at a roughly middle portion of said crushing chamber and aligned with an axial direction of said crushing chamber;

a drive portion connected to said drive shaft and disposed on an upper surface of a ceiling portion of said crushing chamber;

a powder and particle collecting chamber disposed downward of said crushing chamber;

a supporting beam portion disposed upward of said powder and particle collecting chamber;

a height adjusting portion attached to at least one of said crushing chamber and said powder and particle collecting chamber;

a bottom plate insertion portion formed by said height adjusting portion between said crushing chamber and said powder and particle collecting chamber;

a porous bottom plate which is detachably attached to said bottom plate insertion portion, provided with a number of pores;

two or more roller rotating shafts connected to said drive shaft via a connection means;

two or more crushing rollers rotatably fitted to said roller rotating shafts; and crushing elements cooperating with said porous bottom plate to crush material therebetween.

\* \* \* \* \*